United States Patent [19]
Yoshida

[11] Patent Number: 5,539,522
[45] Date of Patent: Jul. 23, 1996

[54] COLOR COPYING MACHINE PROVIDED WITH COLOR CORRECTING CIRCUIT

[75] Inventor: Yasuhiro Yoshida, Nara, Japan

[73] Assignee: Sharp Kabushiki Kaisha, Osaka, Japan

[21] Appl. No.: 966,976

[22] Filed: Oct. 27, 1992

[30] Foreign Application Priority Data

Oct. 29, 1991 [JP] Japan .................................. 3-282919
Nov. 1, 1991 [JP] Japan .................................. 3-287591

[51] Int. Cl.⁶ .................................................... H04N 1/23
[52] U.S. Cl. ...................... 358/296; 358/518; 355/326 R
[58] Field of Search ........................... 358/80, 504, 518, 358/519, 521, 523, 296; 355/246, 208, 326, 327

[56] References Cited

U.S. PATENT DOCUMENTS

| | | | |
|---|---|---|---|
| 2,434,561 | 1/1948 | Hardy et al. | |
| 4,658,286 | 4/1987 | Schwartz et al. | 358/80 X |
| 4,710,785 | 12/1987 | Mills | 346/153.1 |
| 4,730,212 | 3/1988 | Wojcik et al. | 348/61 |
| 4,888,636 | 12/1989 | Abe | 358/80 |
| 4,929,978 | 5/1990 | Kanamori et al. | 358/80 |
| 4,949,135 | 8/1990 | Ng | 355/327 |
| 4,969,049 | 11/1990 | Mitani et al. | 358/296 |
| 5,105,266 | 5/1992 | Telle | 358/80 |

OTHER PUBLICATIONS

Japanese Patent Application Laid–Open (KOKAI), No. 3–84563, Laid Open on Apr. 10, 1991.
Japanese Patent Publication (KOKOKU), No. 1–42558, Published Sep. 13, 1989.
Japanese Patent Application Laid–Open (KOKAI) No. 63–184469, Laid Open on Jul. 29, 1988.
Japanese Patent Application Laid–Open (KOKAI) No. 3–252268, Laid Open on Nov. 11, 1991.
B. Petschik, "Non–Linear Color Correction Algorithm for Hard Copy", *Proceedings The Sixth International Congress on Advances in Non–Impact Printing Technologies*, 21–26 Oct. 1990, Orlando, Florida, The Society for Imaging Science and Technology, Springfield, VA, pp. 803–810.

*Primary Examiner*—John E. Barlow, Jr.
*Attorney, Agent, or Firm*—David G. Conlin; Kevin J. Fournier

[57] ABSTRACT

A color copying machine has a color correcting circuit. The color correcting circuit includes a device for generating reference pattern data on each color, a device for printing the reference pattern data generated by the generating device, a device for reading a printed result of the reference pattern data printed by the printing device, a device for measuring a color reproduction error based on the reference pattern data generated by the generating device and the printed result of the reference pattern data read by the reading device, and a device for calculating a color correction coefficient of each color based on the color reproduction error measured by the measuring device.

22 Claims, 15 Drawing Sheets

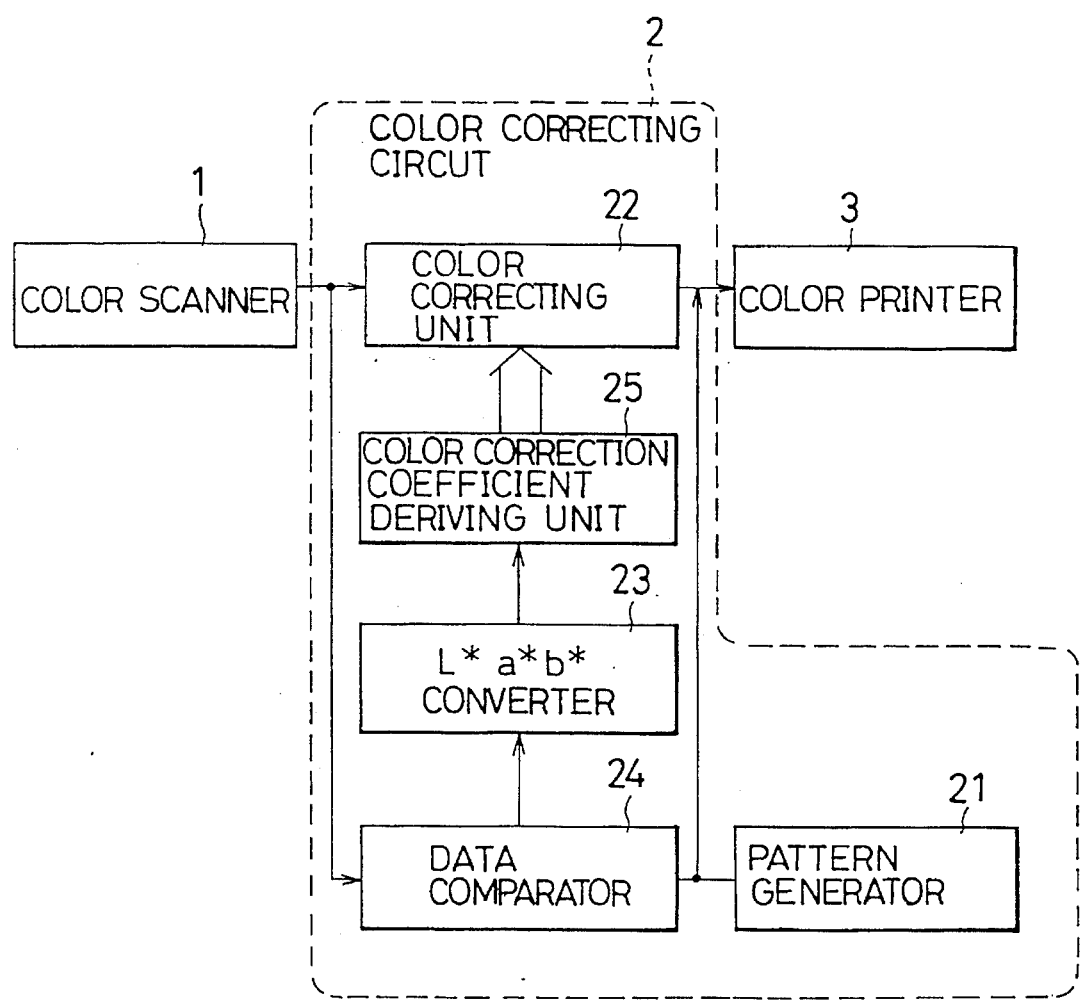

COLOR COPYING MACHINE PROVIDED WITH COLOR CORRECTING CIRCUIT

BACKGROUND OF THE INVENTION

1. Field of the Invention

The present invention relates to a color copying machine for exactly copying a color material on a subject paper, and more particularly to the color copying machine which provides a color correcting circuit.

2. Description of the Related Art

In recent days, a great remark has been placed on a color processing technique which may apply to exact color copying of a subject material or a display image. A color copying machine provided with such a color processing technique known by the inventors of the present application is basically arranged to a color correcting unit, an image reader, a printer, and a memory. In addition, some controllers for various controls may be included in the known copying machine. However, the description herein does not concern with such controllers, because they have no substantial concern with the present invention.

In operation, the image reader serves to read a material to be copied. The reader may be arranged on the same principle as the commercially available color scanner. The read data about the material is corrected by the color correcting unit and is printed as an exact color copy by the printer. The printer is arranged on the same principle as the commercially available color printer.

In actual, however, the known color copying machine does not enable to exactly copy any kind of color material. This is because though the principle of subtractive mixture of color stimuli is applied to the color development of color printing, the known copying machine does not often provide a capability of establishing an additive law and a multiplicative law which are the fundamental principles of the subtractive color mixture. To overcome this shortcoming, the color copying machine performs the color correction operation with the color correcting unit.

As a method commonly used for the color correction, a 3×3 matrix operation represented by the following expression (1) is performed with respect to an input signal (r, g, b) each item standing for red, green and blue.

$$\begin{pmatrix} R \\ G \\ B \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} r \\ g \\ b \end{pmatrix} \quad \text{(Expression 1)}$$

wherein (R, G, B) represents a corrected signal and all to $a_{33}$ denote coefficients for color correction. Those coefficients are set when designing or shipping the products and are constantly stored in the memory.

The color correcting unit is reading the correction coefficients as accessing the memory so that the data is output to the printer as sequentially performing the operations of the expression 1. The color-corrected output can be obtained from the printer.

Next, the principle of the color correction based on this method will be briefly described later. The subtractive mixture of color stimuli done in the color copying machine is arranged on the assumption that the used inks (cyan, magenta, yellow) have the characteristics of independently absorbing the red, the green and the blue.

However, the actually used inks have their characteristics mutually effecting on red, green and blue. To copy each correct color on the principle of the subtractive color mixture, it is necessary to define a printing density of one ink as relating it with two other color densities.

The expression 1 indicates such a mutual influencing relation. By performing the color correction by means of the expression 1 having the properly-defined coefficients substituted therefore, it is possible to eliminate the effect of one color ink on the other colors. This results in allowing the printed output to approximate to the printed colors used in the ideal inks.

The expression 1 indicates the method for color correction based on the 3×3 matrix, while the color correction may be made possible on a matrix containing high degree items as shown in the expression 2.

$$\begin{pmatrix} R \\ G \\ B \end{pmatrix} = \begin{pmatrix} a_{11} & a_{12} & a_{1\,10} \\ a_{21} & a_{22} & \cdots & a_{2\,10} \\ a_{31} & a_{32} & a_{3\,10} \end{pmatrix} \begin{pmatrix} r \\ g \\ b \\ r^2 \\ g^2 \\ b^2 \\ rg \\ gb \\ br \\ c \end{pmatrix} \quad \text{(Expression 2)}$$

The color correction based on the expression 2 may offer higher accuracy than that based on the expression 1, which has been described in Joji Tajima, "Color Masking (II)", Proceedings of Image Electronics, Vol. 18, No. 2, P. 44–48.

In the actual color correction, the expression 1 or 2 is implemented by hardware or software. For the implementation, the proper digital signal processor (DSP) or CPU having a high capability of numerical operations is often used. Or, another CPU functioning as controls may be used.

The coefficients indicated in the expressions 1 and 2 has to be set as considering change in a wide range such as initial design of the products, adjustment in shipping and maintenance for aging. For setting the coefficients in the former two cases, it is possible to take a considerably long time. But, at the maintenance stage, it is not possible to take a long time to terminate the work. In any of those cases, it goes without saying that the variation of the set values has to be lowered to a minimum. That is, the setting of those coefficients indicated in the expression 1 and 2 is required to be implemented, because they define the color reproduction provided by the color machine.

For setting those coefficients, the inventors of the present application know that the repetition of observational evaluations or the least squares method has been used.

If the repetition of observational evaluations is used for setting those coefficients, it may be advantageous in that the color reproduction error for human visual perception may be lowered to a maximum. To properly set the coefficients with this method, it needs to consume a quite long time. In addition, this setting method entails the variation resulting from the difference of human perceptions among inspectors, It means that this setting method cannot make sure of a constant color reproduction accuracy when changing each product model or updating each lot.

As such, this setting method has difficulty in obtaining satisfactory results at the initial design, the adjustment in shipping and the maintenance stage.

In the case of using the least squares for setting the coefficients, in a sense, the set coefficients are made non-variable and optimized.

Now, the method of setting the coefficients on the least squares will be described. Concretely, the multiple regression analysis, which is one kind of the least squares of multiple variables, is employed in this description.

The multiple regression analysis consists of numerical calculations which serve to define a coefficient $a_i$ for describing a depending variable Y according to the definition of the expression 3 by using a plurality of independent variables $X_1$ to $X_n$.

$$Y = a_1 X_1 + a_2 X_2 + \ldots + a_n X_n + C \quad \text{(Expression 3)}$$

wherein $a_i$ denotes a coefficient against an i-th independent coefficient $X_i$ (i=1 to n), C denotes a constant, and n denotes a number of independent variables.

Assuming that the independent variables $X_1$ to $X_n$ denote r, g and b indicated in the expression 1 and Y denotes R therein, by using the multiple regression analysis, the coefficients $a_{11}$ to $a_{13}$ may be obtained.

The procedure for obtaining the coefficients will be performed as follows:

(Step 1) Measure a color sample with a colorimeter and read it from an image input unit.

(Step 2) Print the color sample data and measure the printed result with the colorimeter.

(Step 3) Collect a lot of pieces of measured data and perform the multiple regression analysis by using the measured data of the original color sample and the measured data of the printed result.

(Step 4) Obtain those coefficients as changing Y to G and B.

It is well known that the multiple regression analysis has been established as a numerical calculation program used in a general computer. As such, if several pieces of data are allowed to be collected, with this method, the use of this method is advantageous in that the coefficients can be defined at high speed and the defined coefficients are made non-variable.

However, it has been traditionally necessary to measure a lot of color samples each color at one time. This results in disadvantageously consuming a quite long time for measuring those color samples.

As noted above, the color correction coefficients are set in some stages such as the standard setting at the initial design stage of the products and the adjustment for the products in shipping. The foregoing known methods provides no capability of setting such color correction coefficients as achieving a high color reproduction performance for a quite short time. Hence, heretofore, the setting of the color correction coefficients is not necessarily accurate.

Further, to correct for the aging of the product performance after shipping, it is preferable to reset the color correction coefficients at the maintenance stage of the product. The color correction coefficients cannot be newly rewritten in the light of the structure of the used memory. No disclosure has been proposed of the method for setting less variable and highly reliable coefficients for a short time. As such, in actual, the resetting of the coefficients has been made impossible.

SUMMARY OF THE INVENTION

It is an object of the present invention to provide a color copying machine which provides a color correcting circuit for setting less variable and highly reliable color correction coefficients for a short time and with ease.

In carrying out the object, according to a first aspect of the invention, a color copying machine includes a color correcting circuit, the color correcting circuit having: means for generating reference pattern data about each color; means for printing the reference pattern data generated by the generating means; means for reading a printed output of the reference pattern data printed by the printing means; means for measuring a color reproduction error by comparing the reference pattern data generated by the generating means with the printed result of the reference pattern data read by the reading means; and means for calculating a color correction coefficient of each color based on the color reproduction error measured by the measuring means.

According to a second aspect of the invention, a color copying machine includes a color correcting circuit, the color correcting circuit having: means for generating reference pattern data about each color; means for printing the reference pattern data generated by the generating means; means for reading the printed result of the reference pattern data printed by the printing means; means for measuring a color reproduction error by comparing the reference pattern data generated by the reference pattern data generating means with the printed result of the reference pattern data read by the reading means; means for converting the color reproduction error measured by the color reproduction error measuring means into a Lab color difference; and means for calculating a color correction coefficient about each color based on the output of the converting means.

In operation, the means for generating a reference pattern data serves to generate the reference data for measuring a color reproduction distortion. The printing means serves to print the reference pattern data and add the color reproduction distortion when the data is printed out. The means for reading the printed reference pattern serves to read the printed reference pattern and add the color reproduction distortion obtained in reading the reference pattern. The comparing means serves to compare the generated reference pattern data with the reference pattern for measuring the color reproduction distortion taken between the printing means and the reading means. The reference pattern is arranged to contain as many colors in the color space as possible. Those means function as measuring the reproduction distortions about all the generated colors at a time. This results in allowing the approximate coefficients to be set for a short time in all the stages such as the initial design of the product, the adjustment in shipping, and the maintenance.

As mentioned above, the present invention employs the reference pattern where a lot of colors are properly arranged. Hence, it may provide a capability of accurately measuring the color reproduction distortion for each used color. If an image reader is used as the input means, in particular, the measurement needs only quite a short time. Further, based on the measured result, the coefficients of the color correcting circuit are allowed to be set by using the least squares. This results in making it possible to set non-variable coefficients at high speed.

In deciding the coefficients of the color correcting circuit, the color reproduction errors measured with respect to all the colors are converted to Lab color difference values for the purpose of evaluating those errors in proportional to the visual values. This makes it possible to set the coefficients as visually suitable and non-variable values at high speed.

Those result in improving the reliability of the set values in the stages such as initial designing of the product and adjustment in shipping and reducing the adjusting time at each stage of each stage, thereby enhancing the performance of the product and lowering the manufacturing cost. Further, the coefficients at the maintenance stage for correcting the aging are allowed to be reset. This makes it possible to constantly keep each product at high performance and low cost.

In carrying out the object, according to a third aspect of the invention, a color copying machine having at least an image reading unit and a printing unit, includes: means for generating reference pattern data about each color; means for converting the reference pattern data generated by the generating means and the data given by reading a printed output of the reference pattern data by the reading unit, the printed output being given by the printing unit, into color values based on perception characteristics; multiple regression analyzing means for calculating a color correction coefficient about each color on the basis of the data converted by the converting means; rewritable memory means for storing each color correction coefficient calculated by the multiple regression analyzing means; and means for performing a color correction operation with respect to the color correction coefficients stored in the memory means.

According to a fourth aspect of the invention, a color copying machine having at least an image reading unit and a printing unit, includes: means for generating reference pattern data about each color; multiple regression analyzing means for calculating a color correction coefficient about each color by comparing the reference pattern data generated by the generating means with the data given by reading a printed output of the printing unit by the image reading unit, the printed output being given by the printing unit; rewritable memory means for storing the color correction coefficients calculated by the multiple regression analyzing means; and means for performing a color correction operation with respect to the color correction coefficients stored in the memory means.

According to a fifth aspect of the invention, a color copying machine having at least an image reading unit and a printing unit, includes: a signal I/O unit for transferring data between an external device and the color copying machine itself; the printing unit or printing data received from the external device through the signal I/O unit.; the reading unit for sending the read image data to the external device through the signal I/O unit; a rewritable memory for storing color correction coefficients received from the external device through the signal I/O unit; and a color correction unit for performing a color correction operation with respect to the color correction coefficients stored in the memory.

The reference pattern data generating means serves to generate the pattern used as a reference on which the color reproduction error is measured. The color value converting means has a basic function of converting the reference pattern data generated in the generator and the reference pattern data obtained by reading the printed result with the image reader provided in the copying machine into the color values based on the human perception. The color value converting means serves to convert the reference pattern data generated in the data generating means and the data having a color reproduction error between the printing means and the image reading means into the corresponding color values based on the human perception.

The multiple regression analyzing unit serves to derive a regression coefficient between two color values converted on the perception characteristics for a quite short time.

The reference pattern is configured to have a possible maximum number of colors in the color space. By one operation, the data about a lot of colors can be collected. The regression coefficients derived on this data represent the color reproduction distortions for a lot of colors on the average. This makes it possible to derive the most approximate color correction coefficients by minimum work and for a short time at all the stages such as initial design of the product, adjustment in shipping and maintenance of the product.

Further, the rewritable memory means has a function storing the color correction coefficients derived in the multiple regression analyzing means. As such, the memory holds the derived color correction coefficients. The color correcting means serves to perform the color correction operation as referring to the color correction coefficients held in the memory unit.

The advantages provided by the memory means and the multiple regression analyzing means make it possible to keep the most approximate color correction if the aging takes place in the shipped product. This results in constantly maintaining the most excellent, that is, least variable color reproduction performance.

The signal I/O unit receives the reference pattern data from the external unit and sends it to the printing means for printing it on paper. The reading means serves to read the printing data and send the read data to the external unit through the signal I/O unit.

The color correction coefficients derived on the read data are sent from the external unit to the signal I/O means. The received data is stored in the rewritable memory means. The color correction unit serves to perform the color correction by using the color correction coefficients stored in the memory.

As mentioned above, the color correction coefficients are derived in the external unit containing the reference pattern data generating means, the color value converter, the multiple regression analyzing means, and the signal I/O means. The color copying machine receives the result and uses it for the color correction. This results in making the construction of each color copying machine simpler without having to impair the foregoing advantages.

Further objects and advantages of the present invention will be apparent from the following description of the preferred embodiments of the invention as illustrated in the accompanying drawings.

BRIEF DESCRIPTION OF THE DRAWINGS

FIG. 1 is a block diagram showing a color correcting circuit according to a first embodiment of the invention;

DESCRIPTION OF THE PREFERRED EMBODIMENTS

First Embodiment

Figure 2A:
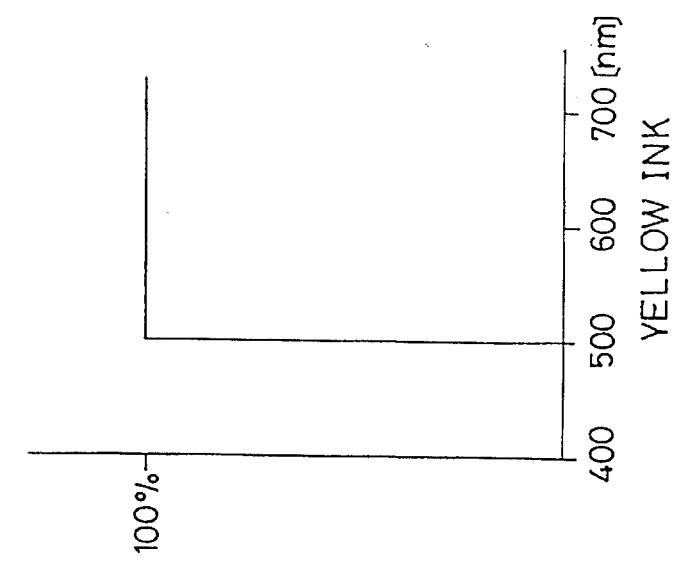
FIGS. 2a to 2c are graphs showing ideal absorption characteristics of ink.
Figure 2B:
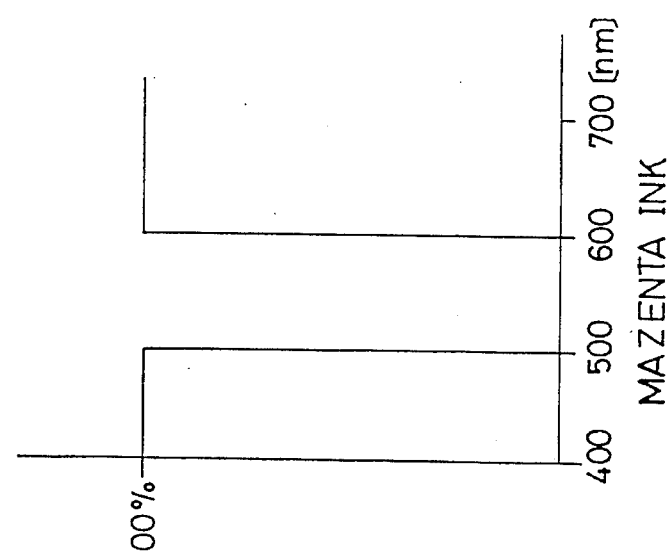
Figure 2C:
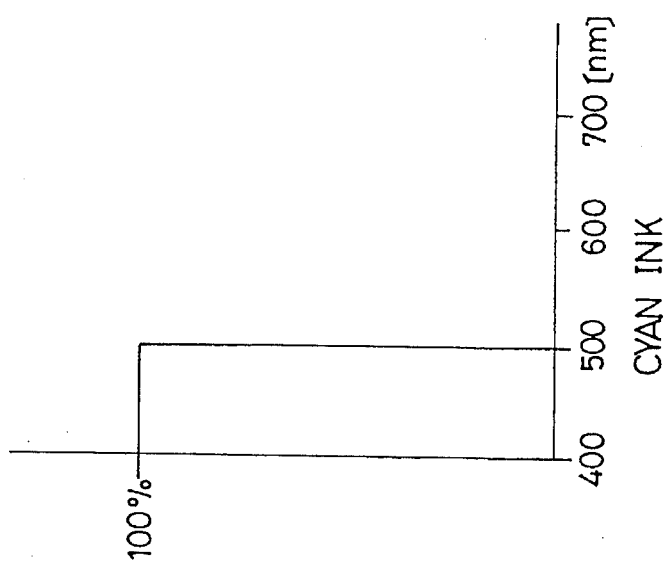
Figure 3C:
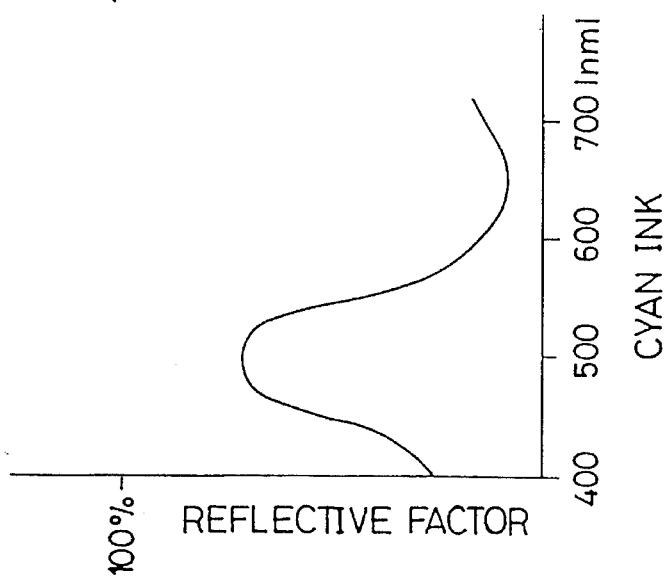
FIGS. 3a to 3c are graphs showing actual absorption characteristics of ink.
Figure 3B:
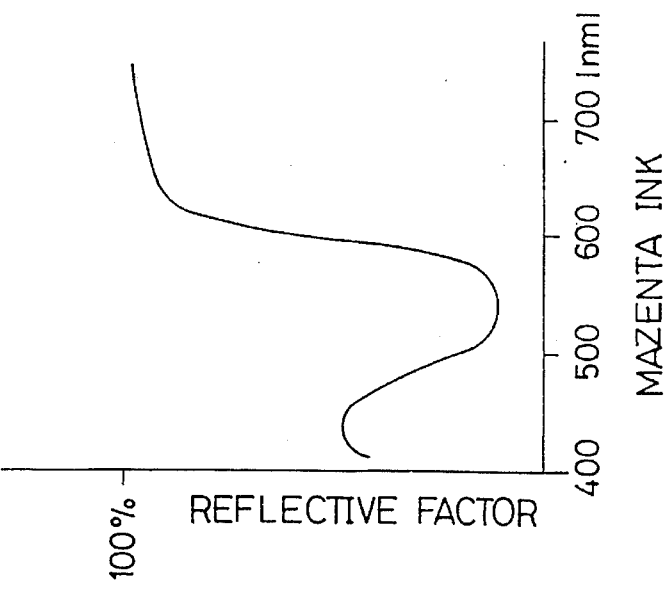
Figure 3A:
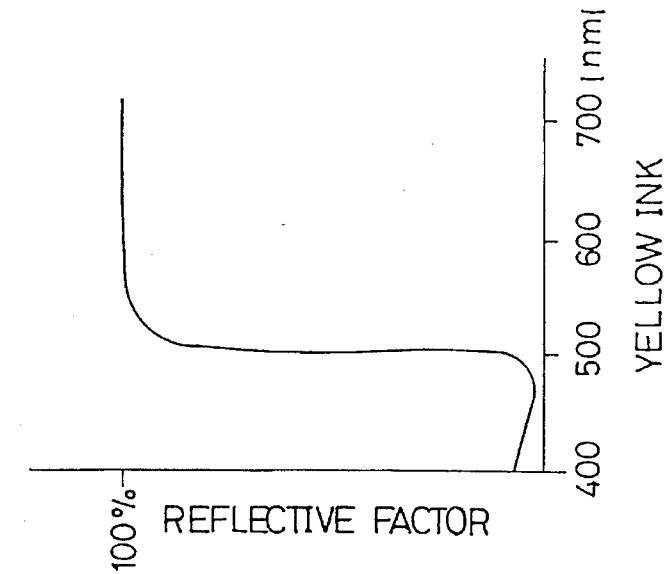
Figure 4:
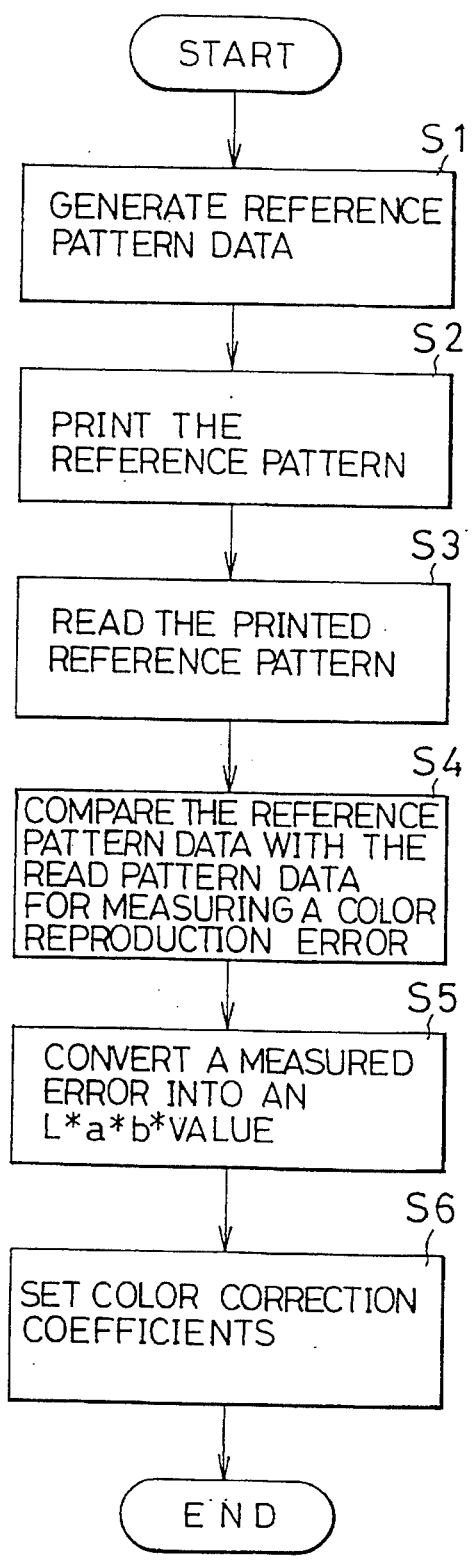
FIG. 4 is a flowchart showing an operation of the color correcting circuit shown in FIG. 1.

FIG. 1 is a block diagram showing a color correcting circuit according to the first embodiment of the invention, FIGS. 2a to 2c are graphs showing ideal absorption characteristics of ink, in which the axis of abscissa denotes a wavelength and the axis of ordinates denotes a reflective factor, FIGS. 3a to 3c are graphs showing actual absorption characteristics of ink, and FIG. 4 is a flowchart showing a method for defining color correction coefficients in the color correcting circuit.

As above mentioned, the subtractive mixture of color stimulidone in the color copying machine is arranged on the assumption that the used inks (cyan, magenta, yellow) have the characteristics of independently absorbing the red, the green and the blue as shown in FIGS. 2a–2c, and the actually used inks have their characteristics mutually effecting on red, green and blue as shown in FIGS. 3a–3c.

In this method, the color reproduction distortions are measured about the possible maximum number of colors in both of the image output by a color printer 3 and the image read by a color scanner 1. Then, the color correction coefficients are derived so that the measured distortions are reversely corrected.

Figure 5:
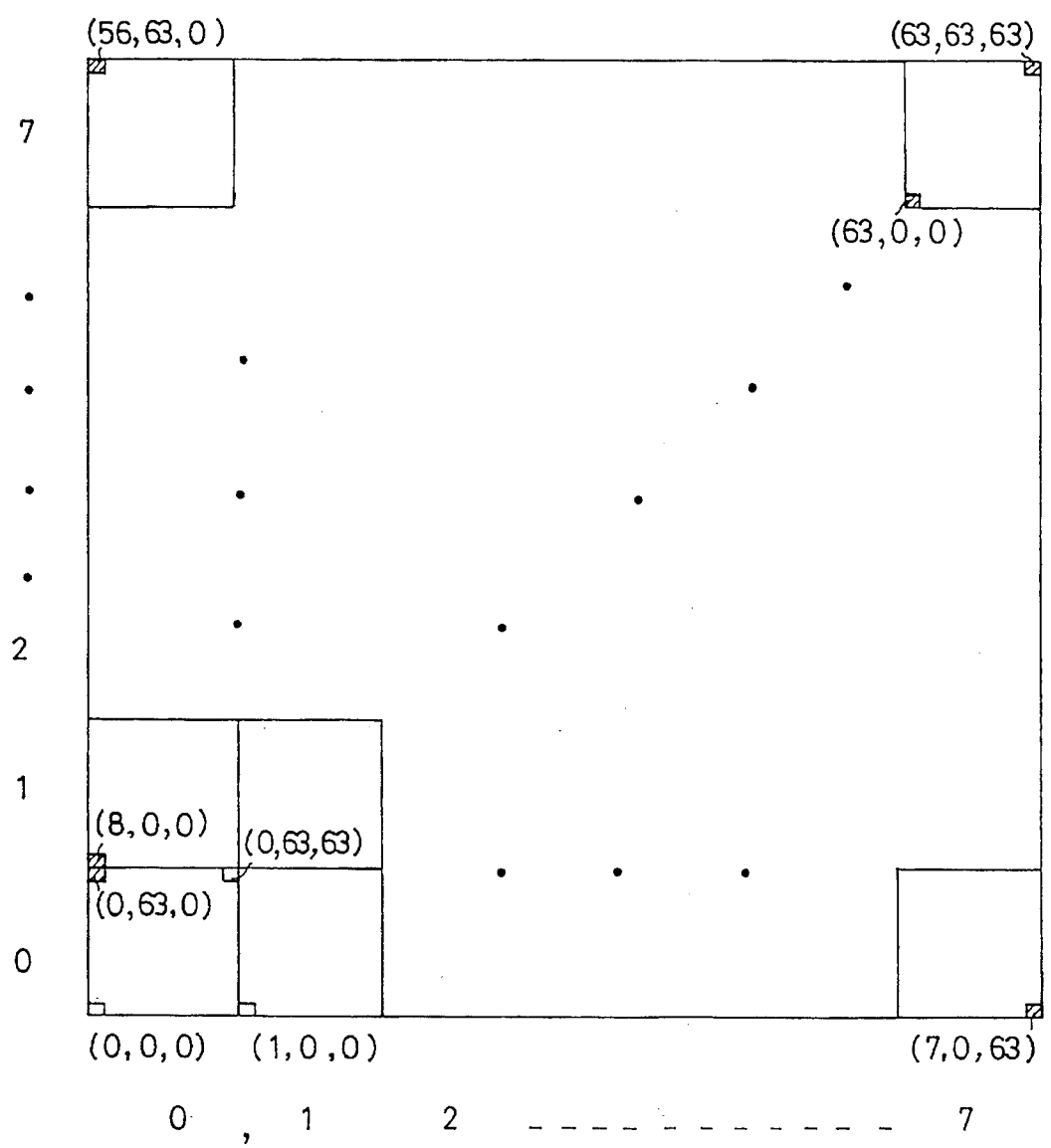
FIG. 5 is a view showing an example of reference pattern data.

At first, for measuring the color reproduction distortions, a pattern generator 21 serves to generate the reference pattern containing a possible maximum number of colors in the color space. The use of such reference pattern makes it possible to measure the color reproduction distortions for all the possible colors by one simple work. For example, assuming that the each color data item for m, n and l colors obtained by dividing the rgb signal into an m stage, an n stage and an l stage is disposed on the plane to correspond to one pixel, or two or more pixels of the image, the distortions for those colors are allowed to be measured. One example of such a reference pattern is shown in FIG. 5. This reference pattern is configured as an image consisting of 512×512 pixels, that is, containing 260,000 ($64^3$) colors. The arrangement of the reference pattern meeting such a condition may be considered in various ways.

The reference pattern generated in the pattern generator 21 is output on paper through the effect of the color printer 3. The output reference pattern entails the color reproduction distortions of the color printer 3.

The output reference pattern is read by the color scanner 1. The read pattern also entails the color reproduction distortions. It means that the reference pattern data corresponds to the generated reference pattern data to which the reproduction distortions of the color printer 3 and the color scanner 1 are added.

The data comparator 24 compares the read reference pattern data with the originally generated reference pattern data so as to derive a color reproduction error between the color printer 3 and the color scanner 1.

The derived color reproduction error is converted to a color reproduction error Lab value in a Lab converter 23. Normally, human perception for a color difference is variable depending on each color area. Hence, the coefficients derived on the color reproduction errors in the color correction circuit may be often variable on the variety of human perception. To overcome the shortcoming due to the variety of human perception, it is necessary to produce a color space where the perceptive distance between each two color areas is kept constant. This color space is referred to as a Lab colorimetric system (herein, 'Lab' denotes an expression 4.) The color difference in the colorimetric system is referred to as a Lab color difference.

$$CIE\ (1976)\ L^*a^*b^* \qquad \text{(Expression 4)}$$

By converting the color reproduction error into this Lab color difference, it is possible to derive the color reproduction coefficients.

This conversion can be performed on the following expression.

$$\begin{pmatrix} X \\ Y \\ Z \end{pmatrix} = \begin{pmatrix} 0.61 & 0.17 & 0.20 \\ 0.3 & 0.59 & 0.11 \\ 0 & 0.07 & 1.11 \end{pmatrix} \begin{pmatrix} R \\ G \\ B \end{pmatrix} \qquad \text{(Expression 5)}$$

$$L^* = 116\ (Y/100)^{1/3} - 16 \qquad \text{(Expression 6)}$$
$$a^* = 500\ [(X/98.2)^{1/3} - (Y/100)^{1/3}]$$
$$b^* = 200\ [(Y/100)^{1/3} - (Z/117.8)^{1/3}]$$

A numeral 25 (see FIG. 1) denotes a color correction coefficient deriving unit 25, which serves to derive coefficients used in the color correction circuit so as to keep the color reproduction error Lab value to a minimum and set the color correction coefficients. To derive the minimum value, it is possible to used the least squares or a neural network which are not descriptive herein, because they have been well known.

As described above, the coefficients of the color correction circuit can be obtained for a short time and with ease.

In doing normal printing, the data read from the color scanner 1 is corrected in the color correcting circuit 21 by using the color correction coefficients. The corrected data is printed on paper through the effect of the color printer 3.

Second Embodiment

Figure 6:
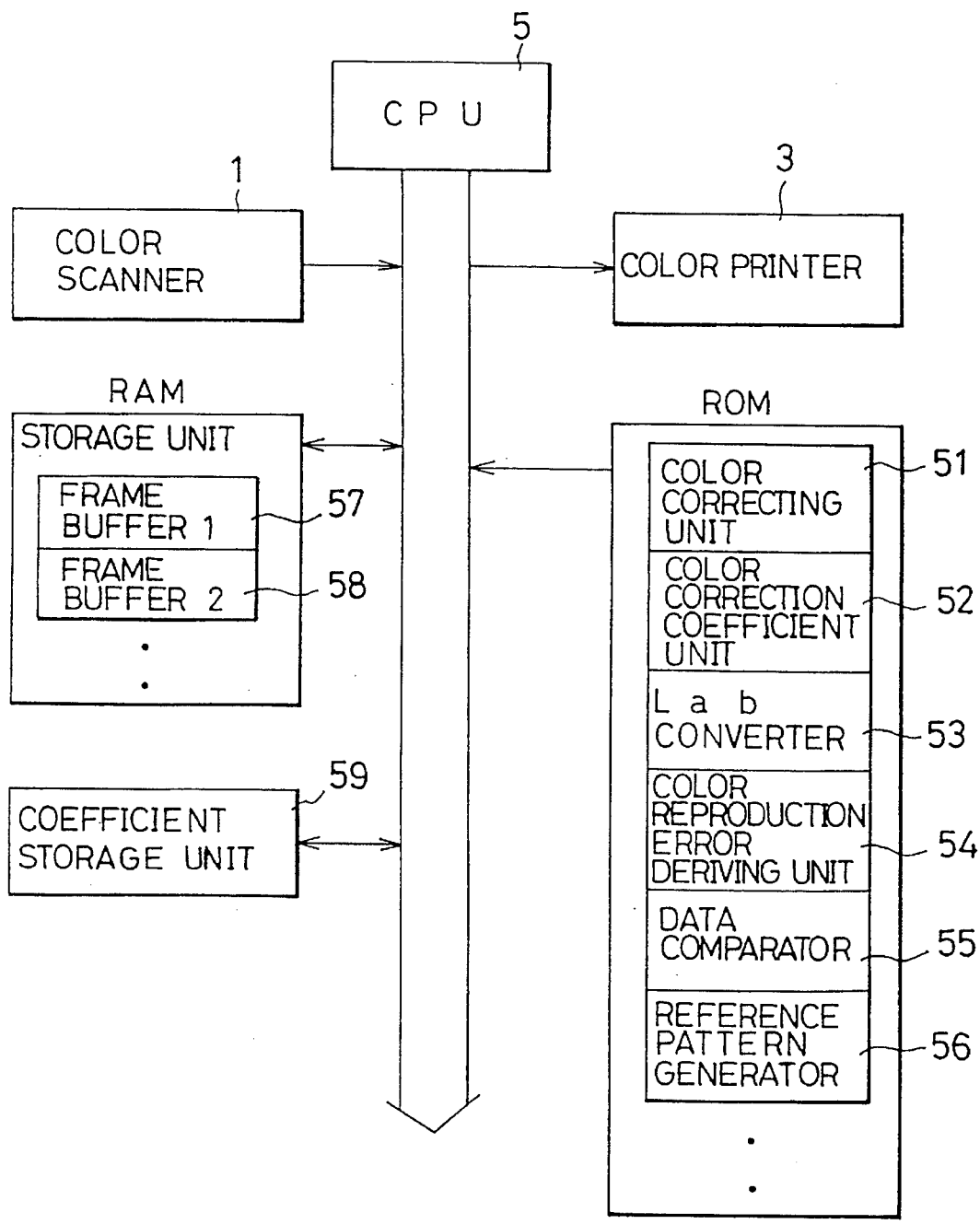
FIG. 6 is a block diagram showing a color correcting circuit according to a second embodiment of the invention.

FIG. 6 is a block diagram showing a color correcting circuit according to a second embodiment of the invention.

The color correcting circuit is arranged to have a color scanner 1, a color printer 3, and a computer. The computer includes a color correcting unit 51, a reference pattern generator 56 for generating the reference pattern data, a data comparator 55 for comparing the reference pattern data read by the color scanner 1 with the originally generated reference pattern data, a color reproduction error deriving unit 54 for deriving a color reproduction error based on the compared data, a Lab converter 53 for converting the derived color reproduction error into a color reproduction Lab value, and a color correction coefficient unit 52 for deriving and setting the final color correction coefficients from the derived Lab values.

The method for defining the color correction according to the second embodiment will be described in detail as referring to FIG. 4.

S1: A CPU 5 controls the reference pattern data generator 56 to generate the reference pattern data and store it in a first frame buffer 57.

S2: The reference pattern data is read from the first frame buffer 57 and is printed out by the color printer 3.

S3: The printed reference pattern is read by the color scanner 1 and is stored in a second frame buffer 58. The data stored in the second frame buffer 58 entails the color reproduction errors caused in both the color printer 3 and the color scanner 1.

S4: The data comparator 55 serves to compare the originally generated reference pattern data shored in the first frame buffer 57 with the reference pattern data obtained at the step S3 and stored in the second frame buffer 58 so as to derive the color reproduction error based on the compared result in the color reproduction error deriving unit 54.

S5: The color reproduction error obtained at the step S4 is converted into the color reproduction error Lab value according to the expressions 4 and 5.

S6: The unit 52 serves to derive a maximum coefficient from the Lab value obtained at the step S5 by means of the least squares or the neural network and store the derived coefficient in a coefficient storage unit 59.

As noted above, the coefficients of the color correction circuit can be obtained for a short time and with ease. In doing normal printing, the color correcting unit 51 serves to correct the data read by the color scanner 1 by using the coefficients obtained by the foregoing method. Then, the color printer 3 serves to print out the corrected data.

Figure 7:
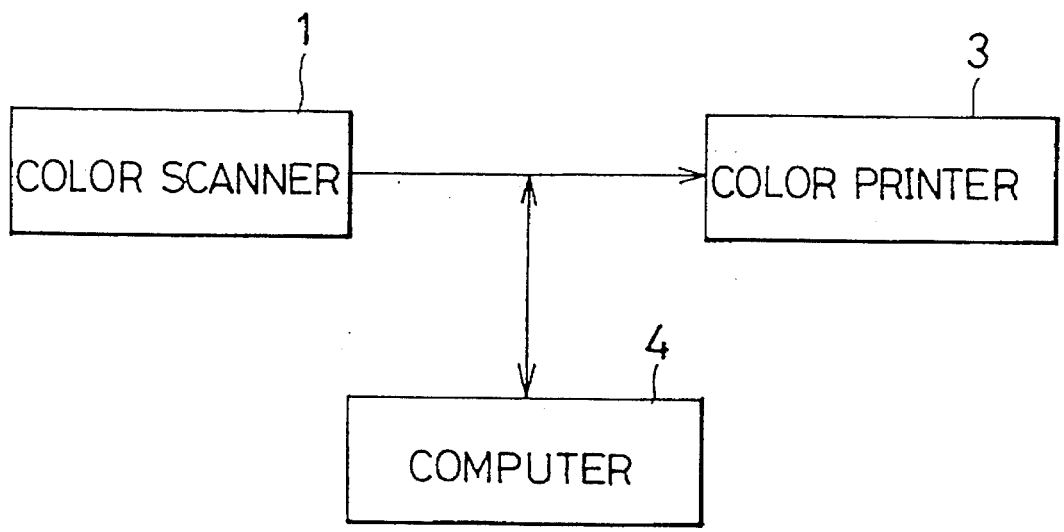
Fig. 7 is a block diagram showing a transformation of the color correcting circuit shown in FIG. 6.

Unlike one integral device as shown in FIG. 6, as shown in FIG. 7, an individual color scanner 1, an individual color printer 3, and an individual computer 4 may be combined to configure another embodiment of this invention.

Third Embodiment

Figure 8:
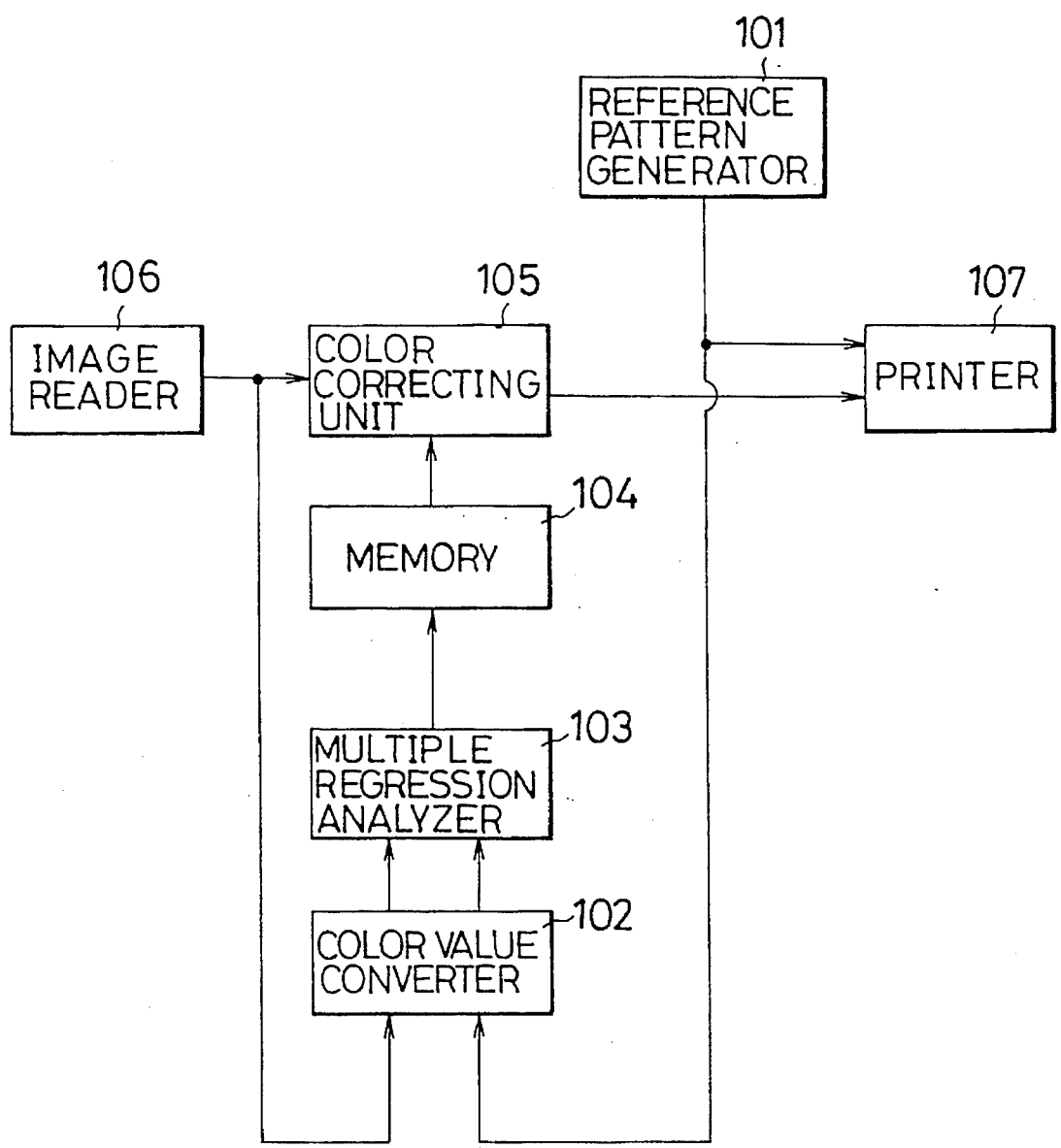
FIG. 8 is a block diagram showing a color copying machine according to a third embodiment of the invention.

FIG. 8 is a functional block diagram showing a color copying machine according to a third embodiment of the invention.

As compared to the known color copying machine as described above, a reference pattern data generator 101, a color value converter 102, and a multiple regression analyzer 103 are additionally provided. Moreover, a memory 104 is a rewritable type. The description will be directed to how the shortcomings described above are overcome by using these additional features.

Figure 9:
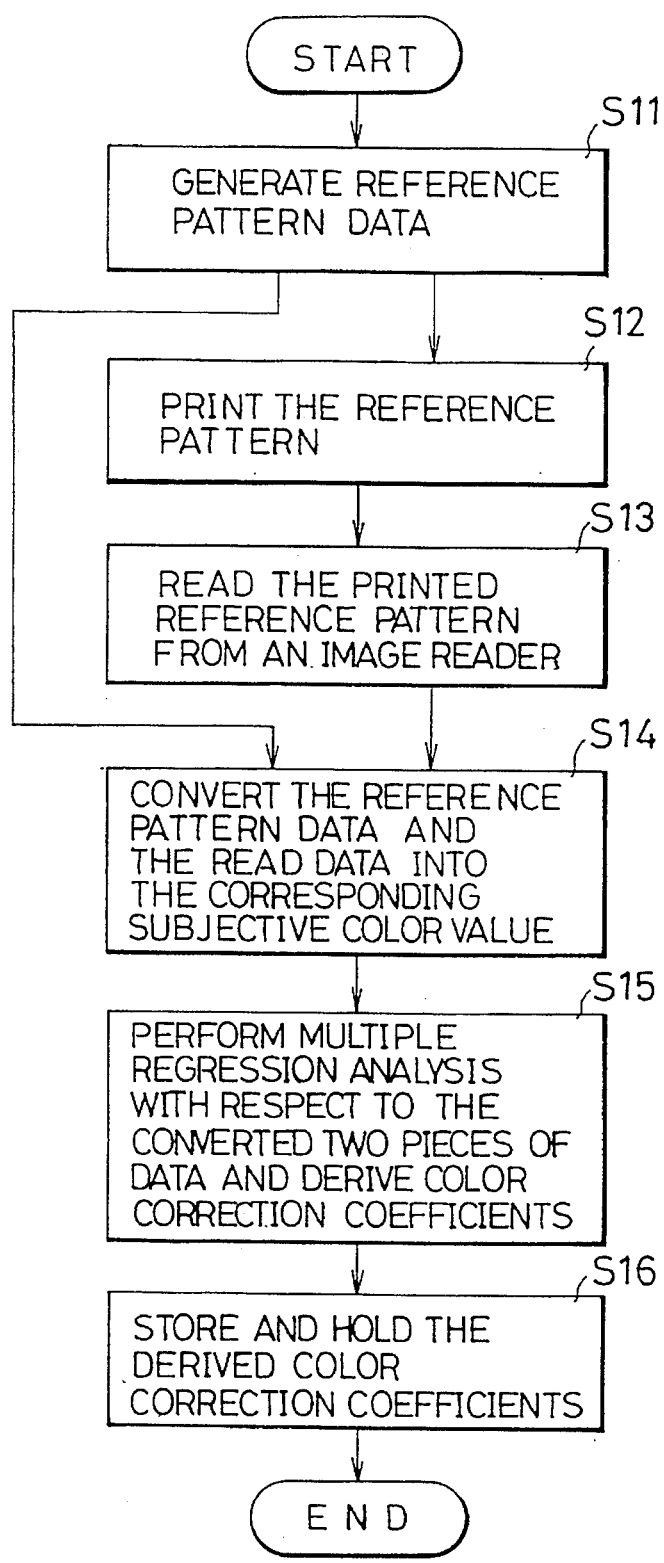
FIG. 9 is a flowchart showing an operation for defining each color correction coefficient.

At first, how the color correction coefficients are derived will be described. FIG. 9 is a flowchart showing the method for defining the color correction coefficients. In general, the method according to this invention takes the steps of grasping a possible maximum number of original colors in a color space and the colors processed through the printer 107 and the image reader 106 by one simple work, converting those colors into color values based on the human perception, and deriving the color correction coefficients through the effect of the multiple regression analyzer 103.

The concrete description will be made as referring to FIGS. 8 and 9. At a step 11, the pattern generator 101 serves to generate the reference pattern containing a possible maximum number of colors in the color space. The pattern generator 101 is configured of storage units such as a ROM or a hard desk and thus can store the generated reference pattern data.

Assume that the image consists of 512×512 pixels and the number of quantatizing bits is 8. In the assumption, the overall volume of those storage units needs to be about 786,432 bytes, which are calculated by:

$$512 \ (pixels) \times 512 \ (pixels) \times 3 = 786432$$

Figure 10:
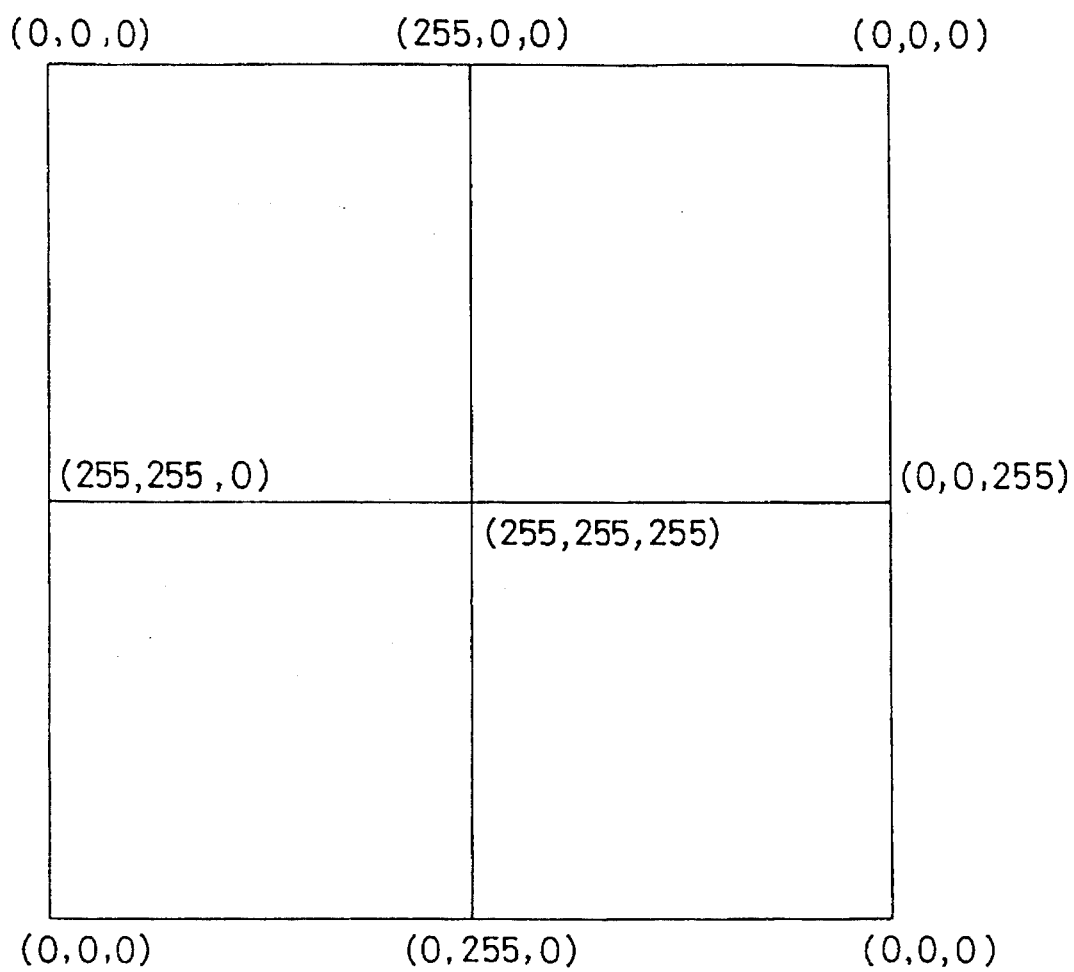
FIG. 10 is a view showing one example of a reference pattern used in the invention.
Figure 11:
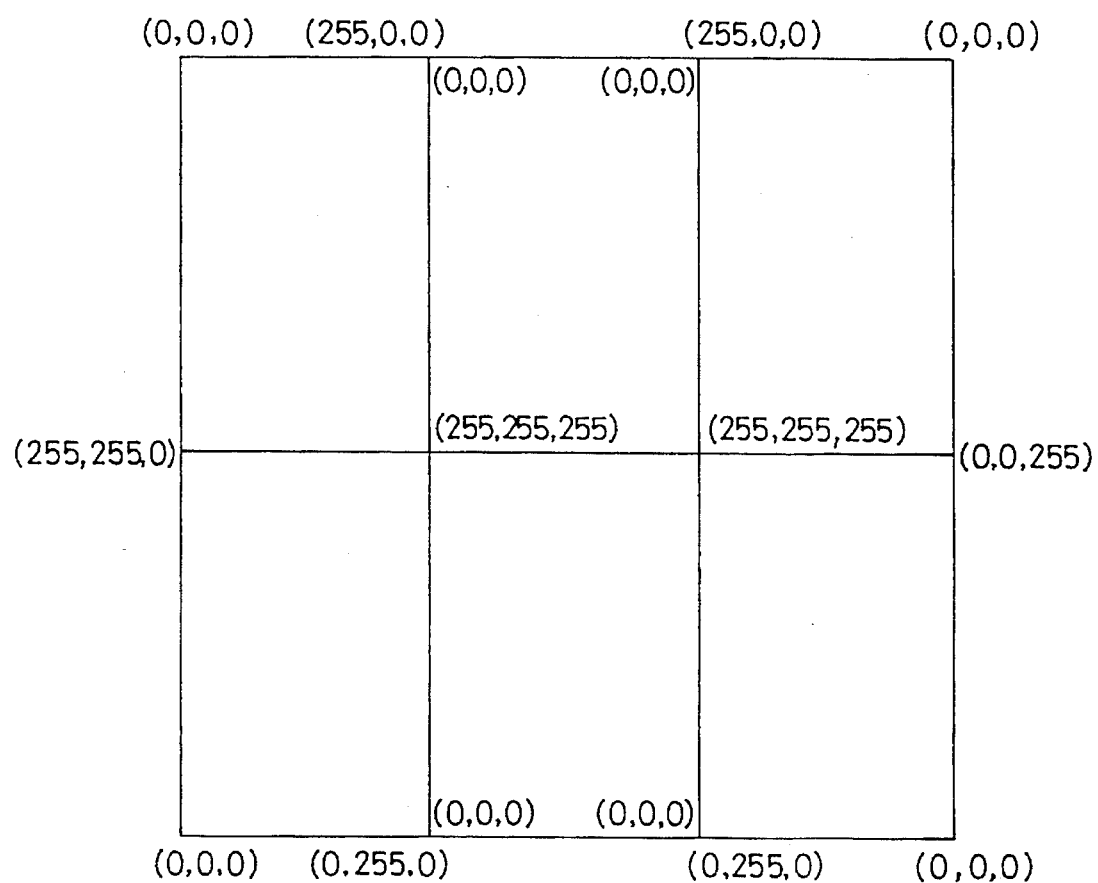
FIG. 11 is a view showing another example of a reference pattern used in the invention.

The reference pattern image is an image containing a possible maximum number of colors in the color space. One example of the reference pattern image will be shown in FIGS. 10 and 11. The reference pattern image may be arranged in various manners. Whatever arrangements the reference pattern image may take, if the distribution of the colors in the color space are similar in respective arrangements, this invention may offer the same effect.

Figure 12:
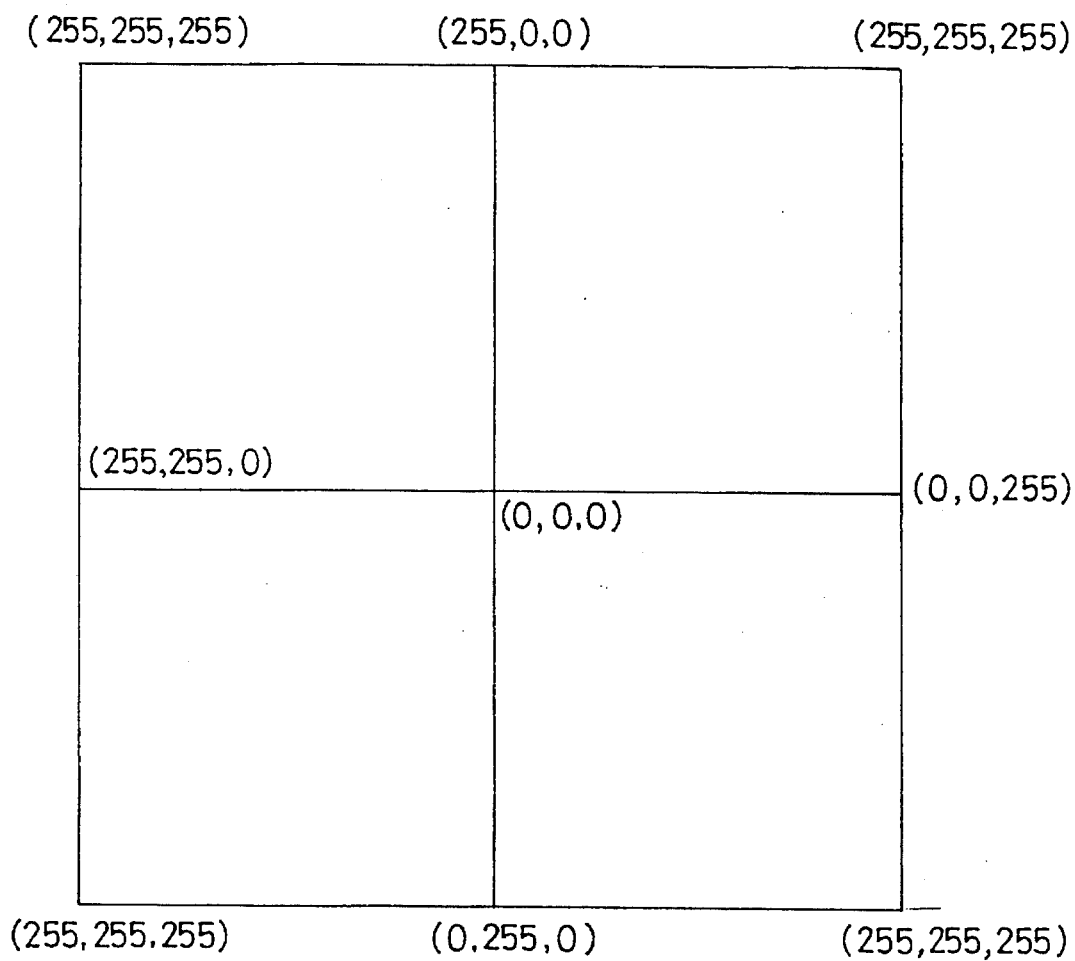
FIG. 12 is a view showing a reference pattern offering the same effect as the reference pattern shown in FIG. 10.
Figure 13:
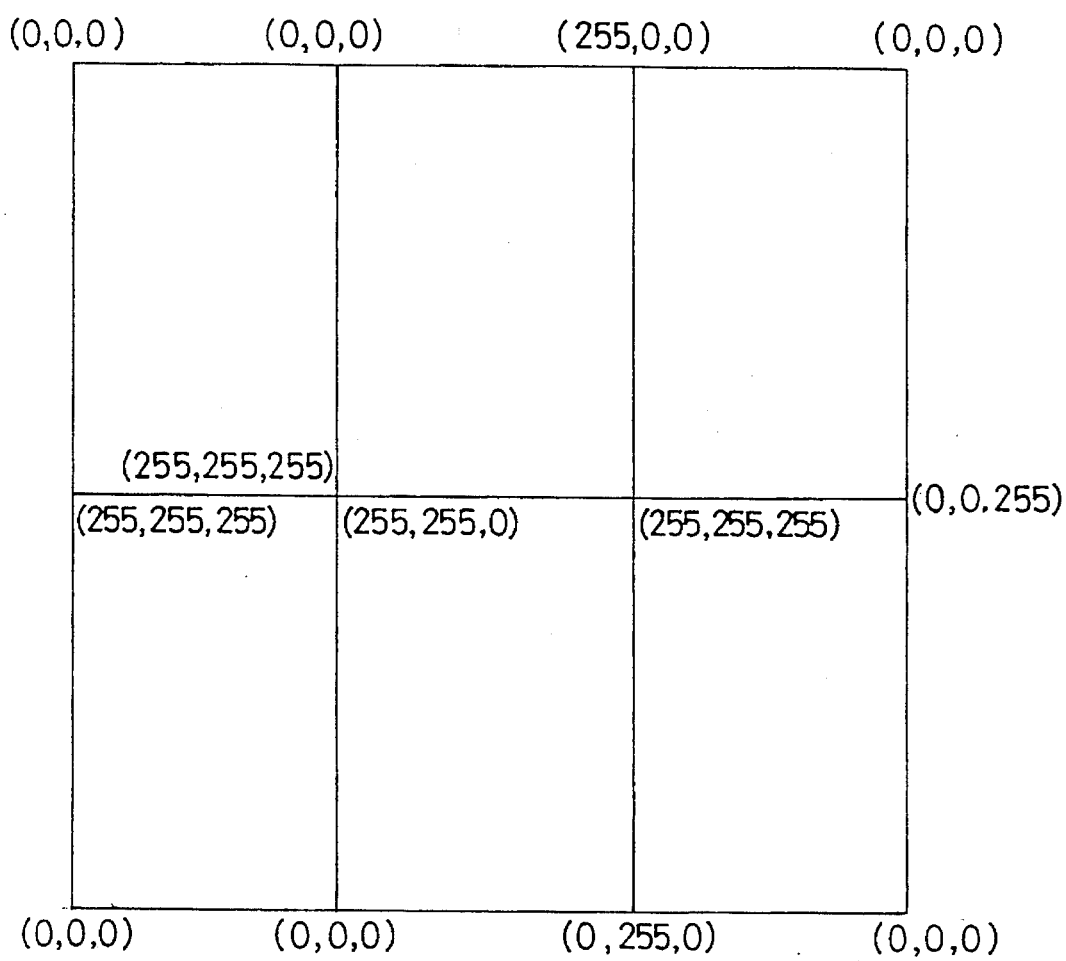
FIG. 13 is a view showing a reference pattern offering the same effect as the reference pattern shown in FIG. 11.

Hence, the significant factor is the difference of the distribution of the colors composing an image in the color space, rather than the apparent arrangement. For example, the reference pattern images shown in FIGS. 12 and 13 are apparently different from those shown in FIGS. 10 and 11. However, the distribution of the colors in the color space is similar in each reference pattern image. They are the same reference pattern images in light of the spirit of the invention. The image may take lots of arrangements.

In such a reference pattern image, it is considered that one pixel corresponds to one color sample described in the known technique. The use of such a reference pattern image may bring about the same effect as the case where the coefficients are derived in the known art by using a lot of color samples. As another reference pattern, it is easily arranged where two or more pixels correspond to one color sample.

Turning to S12, the data is printed by the printer 107 ordinarily included in the copying machine. At the step S13, the printed image is read by the normal image reader 106 included in the copying machine. These printing and reading operations are allowed to be handled by a user himself.

The read data contains the originally generated reference pattern data plus the color reproduction distortions of the printer 107 and the image reader 106. As such, it is expected that some difference takes place between the originally generated reference pattern data and the read reference pattern data. This difference corresponds to the color reproduction error appearing when normal copying is performed.

At a step S14, the color value converter 102 serves to convert the originally generated reference pattern data and the read reference pattern data into the color values based on the human perception. This is because the color reproduction error is evaluated on the basis of the human perception. This conversion makes it possible to visually keeping the color reproduction error to a minimum.

Those color values are:

CIE (1976) L*a*b* value (Expression 7),

CIE (1976) L*u*v* value (Expression 8)

and Munsell value.

Herein, the term "Lab" means the expression 7.

For example, the conversion into the Lab value is performed on the following expression.

$$L^* = 116 \ (Y/100)^{1/3} - 16$$
$$a^* = 500 \ [(X/98.2)^{1/3} - (Y/100)^{1/3}]$$
$$b^* = 300 \ [(Y/100)^{1/3} - (Z/117.8)^{1/3}]$$
(Expression 9)

$$\begin{pmatrix} X \\ Y \\ Z \end{pmatrix} = \begin{pmatrix} 0.61 & 0.17 & 0.20 \\ 0.30 & 0.59 & 0.11 \\ 0 & 0.07 & 1.11 \end{pmatrix} \begin{pmatrix} R' \\ G' \\ B' \end{pmatrix}$$

wherein R', G'and B'denote R, G, B or r, g, b in the expression 1 or 2.

The color value converter 102 may be easily configured of a microcomputer having the programmed expressions or a digital signal processor.

At a step 15, the multiple regression analyzer 103 serves to derive the corrected coefficients needed for the color correction, based on the Lab values.

As mentioned above, the reference pattern image is arranged so that one pixel corresponds to one color sample. As such, the multiple regression analysis is required to be performed in a manner to match the color sample of the originally generated reference pattern data to the corresponding color sample (standing the same color) of the read pattern data, both of which have been converted into the color values based on the perception characteristics in the color value converter 102.

When the printed reference pattern is read at the step S13, the user has to put the printed material at a right place. This can be easily achieved by putting a suitable mark on the image reader 106.

The coefficients derived by the multiple regression analyzer 103 correspond to the matrix coefficients shown in the expressions 1 and 2. Like the color value converter 102, to easily obtain the coefficients, it is better to arrange the multiple regression analyzer 103 by using a microcomputer having a programmed regression analyzing process.

The reference pattern data generator 101, the color value converter 102, and the multiple regression analyzer 108 enable to do their suitable functions if a proper storage unit and a programmed microcomputer are used for composing them. Those storage unit and microcomputer are pre-built for controlling various operations in the known copying machine. In actual, therefore, the present invention may be achieved if the program for executing the foregoing function is newly built in the existing microcomputer.

At a step 16, the resulting color correction coefficients are stored in the rewritable memory 104. That is, the memory 104 constantly holds the latest color correction coefficients. The values given in the standard state of the product, that is, when shipping the product may be held together with the coefficients in the memory 104. The memory 104 may be easily configured of an EEPROM or a hard disk and a rewritable type for achieving the object of the invention.

As referring to FIG. 8, the operation will be more concretely described. The reference pattern data generated in the generator 101 is guided into the printer 107 and the color value converter 102. The data guided to the printer 107 is printed at the initial stage of the flowchart shown in FIG. 9. The data guided to the color value convert 02 is converted into the color values such as the Lab values formed based on the human perception.

The reference pattern printed in the printer 107 is read from the image reader 106 with a help of the user's hands. The read data is guided to the color value converter 102 for converting it into the color values such as the Lab color values formed based on the human perception.

The two color data items converted in the color value converter 102 are guided into the multiple regression analyzer 103. The multiple regression analysis is performed in terms of the data items for deriving the color correction coefficients. The data about the color correction coefficients are guided to the memory 104 and stored in it.

Lastly, the color correcting unit 105 performs the color correction operation as referring to the data held in the memory 104. When the material is read from the image reader 106, the read data is guided to the color correcting unit 102. The color correcting unit 102 serves to perform the color correction operation as referring to the data about the color correction coefficients stored in the memory 104 and then output the resulting data to the printer 107.

Fourth Embodiment

Figure 14:
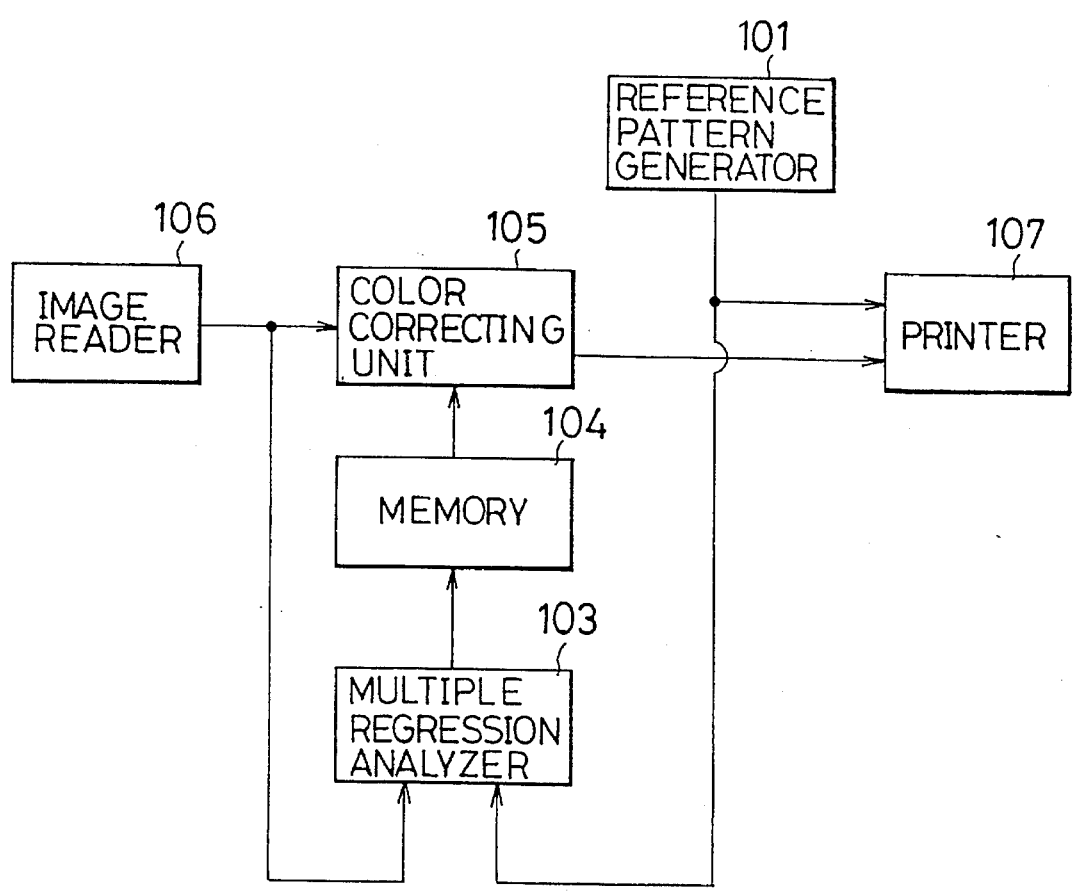
FIG. 14 is a block diagram showing a color copying machine according to a fourth embodiment of the invention.

FIG. 14 shows a color copying machine according to a fourth embodiment of the invention. As shown, this embodiment does not have the color value converter 102 shown in FIG. 8. The color value converter 102 is provided for the purpose of evaluating the color reproduction error based on the human perception and defining the color correction coefficients. If, therefore, one of the objects of the invention, that is, "simplifying the adjustment and reducing the adjusting time" is considered as the most important factor, the color value converter 102 may be removed from the fourth embodiment.

The other components of this embodiment operate in the similar manner to those of the third embodiment shown in FIG. 8. Hence, the description about those components is eliminated for avoiding the overlap.

Fifth Embodiment

Figure 15:
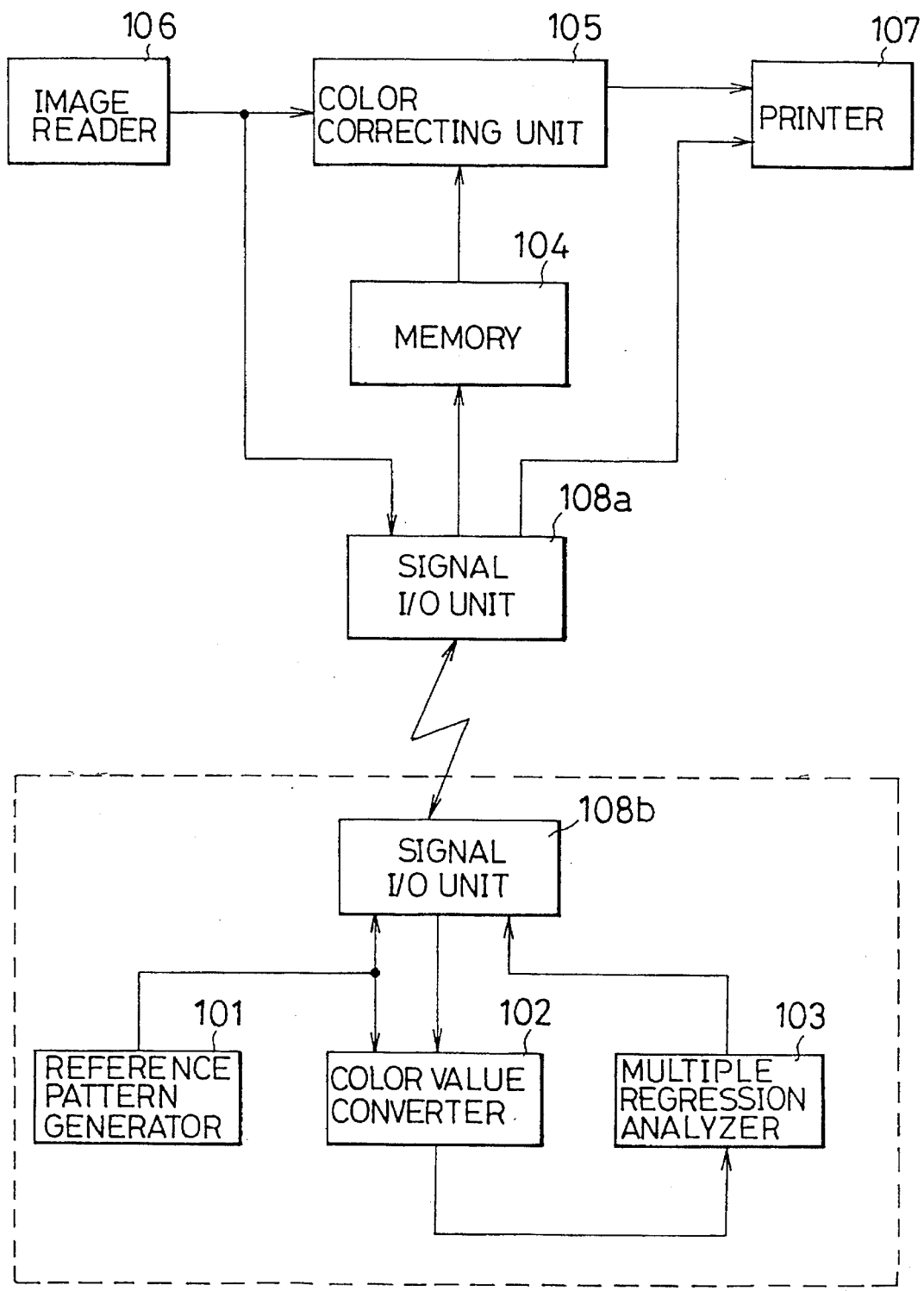
FIG. 15 is a block diagram showing a color copying machine according to a fifth embodiment of the invention.

FIG. 15 shows a color copying machine according to a fifth embodiment of the invention. As shown, this embodiment additionally includes a new signal I/O unit 108a to the pattern generator 101, the color value converter 102, and the multiple regression analyzer 103 described in the third embodiment of the invention. The signal I/O unit 108b, the pattern generator 101, the color value converter 102 and the multiple regression analyzer 103 are arranged as an external device (enclosed by a broken line of FIG. 15).

Further, in addition to the memory 104, the color correcting unit 105, the image reader 106, and the printer 107, a signal I/O unit 108a are included on the side of the color copying machine so as to transfer various kinds of data between the external device and the color copying machine.

The reference pattern data generator 101, the color value converter 102, and the multiple regression analyzer included in the external device are normally used in the maintenance stage after temporarily terminating the adjustment, that is, shipping the product. To simplify the arrangement of the color copying machine and lower the cost of the machine itself, it is possible to exclude those components from the color copying machine.

To obtain the substantially same color correction coefficients as those described in terms of the third embodiment of the invention, the following process is required to be implemented by using the reference pattern data generator 101, the color value converter 102, and the multiple regression analyzer 103 located in the external device.

At first, as shown in FIG. 15, the signal input/output (I/O) unit 108 on the side of the color copying machine is connected to the signal I/O unit 108b on the side of the external unit. The signal I/O units 108a and 108b for executing an I/O of the data may be basically arranged of a standard interface such as RS232C, SCSI, or GP-IB.

The signal I/O unit 108a is connected to the printer 107, the image reader 106, and the rewritable memory 104 so that the data may be transferred between those components and the external device. Likewise, the signal I/O unit 108b is connected to the reference pattern data generator 101, the color value converter 102, and the multiple regression analyzer 103.

The external device serves to send the reference pattern data from the reference pattern data generator 101 to the color copying machine through the signal I/O unit 108b. The signal I/O unit 108a receives the data. Then, the printer 107 serves to print the received data on paper. Next, the image reader 106 reads the printed image and sends the read data to the external device through the signal I/O unit 108a. The data is received by the signal I/O unit 108b and is guided to the color value converter 102.

The color value converter 102 serves to convert the originally generated reference pattern data and the data read by the image reader into the Lab color values. The multiple regression analyzer 103 serves to derive the regression coefficients based on the converted Lab color values and send the derived values as the color correction coefficients to the color copying machine through the signal I/O unit 108b.

On the side of the color copying machine, the rewritable memory 104 stores the color correction coefficients sent from the external device. It is obvious that those coefficients are the same as those described in terms of the third embodiment of the invention. The color correcting unit 102 performs the color correction based on the data stored in the memory 104.

When the image reader 106 reads the subject material, the read data is guided into the color correcting unit 105. The color correcting unit 105 performs the color correction as referring to the data about the color correction coefficients stored in the memory 104 and output the corrected data to the printer 107.

What is required for the reference pattern data generator 101, the color value converter 102, and the multiple regression analyzer 103 located in the external device is to transfer the data between the external device and the color copying machine. That is, they may just have the same functions as those described as referring to FIG. 8. This external device may be arranged of a dedicated device or a notebook type hand-held computer.

The color value converter 102 may be removed like the fourth embodiment of the invention.

Many widely different embodiments of the present invention may be constructed without departing from the spirit and scope of the present invention. It should be understood that the present invention is not limited to the specific embodiments described in the specification, except as defined in the appended claims.

What is claimed is:

1. A color copying machine having at least an image reading unit and a printing unit, comprising:

means for generating reference pattern data containing $m \times n \times l$ colors, m, n, and l each representing a number of divided stages of respective ones of the red, green and blue signals;

means for converting the reference pattern data generated by said generating means and the data obtained by said image reading unit, the printed matter being obtained by printing unit, into color values of $m \times n \times l$ based on perception characteristics;

multiple regression analyzing means for calculating a color correction coefficient on each color on the basis of the color values converted by said converting means;

rewritable memory means for storing each color correction coefficient calculated by said multiple regression analyzing means; and means for performing a color correction operation with respect to the color correction coefficients stored in said memory means.

2. The machine of claim 1, wherein said reference pattern data consists of 512×512 pixels and contains 260,000 colors.

3. The machine of claim 1, wherein said number is greater than one.

4. The machine of claim 1, wherein said color values of $m \times n \times l$ based on perception characteristics are Lab values.

5. The machine of claim 4, wherein said Lab values are defined by $$L=116(Y/100)^{1/3}-16$$

$$a=500\{(X/98.2)^{1/3}-(Y/100)^{1/3}\}$$

$$b=300\{(Y/100)^{1/3}-(Z/117.8)^{1/3}\}.$$

6. The machine of claim 1, wherein said color values of $m \times n \times l$ based on perception characteristics are Lub values.

7. A color copying machine having at least an image reading unit and a printing unit, comprising:

means for generating reference pattern data containing $m \times n \times l$ colors, m, n and l each representing a number of divided stages of respective ones of the red, green and blue signal;

multiple regression analyzing means for calculating a color correction coefficient on each color on the basis of data of $l \times m \times n$ colors contained in the reference pattern data generated by said generating means and the data of $l \times m \times n$ colors obtained by reading a printed matter of said printing unit using said image reading unit, the printed matter being obtained by said printing unit;

rewritable memory means for storing color correction coefficients calculated by said multiple regression analyzing means; and means for performing a color correction operation with respect to the color correction coefficients stored in said memory means.

8. The machine of claim 7, wherein said reference pattern data consists of 512×512 pixels and contains 260,000 colors.

9. The machine of claim 7, wherein said number is greater than one.

10. A color copying machine having at least an image reading unit and a printing unit, comprising:

a signal input/output unit for transferring data between an external device and said color copying machine;

rewritable memory for storing color correction coefficients received from said external device through said signal input/output unit; and a color correction unit for performing a color correction operation with respect to the color correction coefficients stored in said memory, wherein said printing unit is adapted to print the data received from said external device through said signal input/output unit, said reading unit is adapted to send the read image data to said external device through said signal input/ output unit and said external device includes generating means for generating reference pattern data containing $m \times n \times l$ colors, m. n and l each representing a number of divided stage of respective ones of the red, green and blue signals, means for converting the reference pattern data generated by said generating means, and multiple regression analyzing means for calculating a color correction coefficient on each color on the basis of the data of $l \times m \times n$ colors converted by said converting means.

11. The machine of claim 10 wherein said reference pattern data consists of 512×512 pixels and contains 260,000 colors.

12. The machine of claim 10, wherein said number is greater than one.

13. A color copying machine having at least an image reading unit and a printing unit, comprising:

a signal input/output unit for transferring data between an external device and said color copying machine;

a rewritable memory for storing color correction coefficients received from said external device through said signal input/output unit; and a color correction unit for performing a color correction operation with respect to the color correction coefficients stored in said memory, wherein said printing unit is adapted to print the data received from said external device through said signal input/output unit, said reading unit is adapted to send the read image data to said external device through said signal input/output unit and said external device includes generating means for generating reference pattern data containing m×n×l colors, m, n and l each representing a number of divided stages of a respective one of the red, green and blue signals, means for converting the reference pattern data generated by said generating means and the data obtained by said image reading unit through said input/output unit, the printed matter being obtained by printing the reference pattern data using said printing unit, into color values of m×n×l based on perception characteristics, and multiple regression analyzing means for calculating a color correction coefficient on each color on the basis of the data of l×m×n colors converted by said converting means.

14. The machine of claim 13, wherein said color values of m×n×l based on perception characteristics is a Lab value.

15. The machine of claim 14, wherein said Lab values are defined by $$L=116(Y/100)^{1/3}-16$$

$$a=500\{(X/98.2)^{1/3}-(Y/100)^{1/3}\}$$

$$b=300\{(Y/100)^{1/3}-(Z/117.8)^{1/3}\}.$$

16. The machine of claim 13, wherein said color values of m×n×l based on perception characteristics are Lub values.

17. A color copying machine having at least an image reading unit and a printing unit, comprising:

a signal input/output unit for transferring data between an external device and said color copying machine;

a rewritable memory for storing color correction coefficients received from said external device through said signal input/output unit; and a color correction unit for performing a color correction operation with respect to the color correction coefficients stored in said memory, wherein said printing unit is adapted to print the data received from said external device through said signal input/output unit, said reading unit is adapted to send the read image data to said external device through said signal input/output unit and said external device includes generating means for generating reference pattern data containing m×n×l colors, m, n, and l each representing a number of divided stages of a respective one of the red, green and blue signals, and multiple regression analyzing means for calculating a color correction coefficient on each color on the basis of the data of l×m×n colors.

18. An external device for a color copying machine comprising:

generating means for generating reference pattern data containing m×n×l colors, m, n and l each representing a number of divided stages of a respective one of the red, green and blue signals; and multiple regression analyzing means for calculating a color correction coefficient on each color on the basis of the data of l×m×n colors.

19. The external device of claim 18, wherein said external device further comprises a signal input/output unit for transferring data between said external device and said color copying machine, and wherein said generating means is adapted to send the generated data to said copying machine through said signal input/output unit, said multiple regression analyzing means is adapted to receive data from said copying machine through said signal input/output unit.

20. A color copying machine having at least an image reading unit and a printing unit, comprising:

a signal input/output unit for transferring data between an external device and said color copying machine; and a color correction unit for performing a color correction operation with respect to the color correction coefficients received from said external device through said signal input/output unit, wherein said printing unit is adapted to print the data received from said external device through said signal input/output unit, said reading unit is adapted to send the read image data to said external device through said signal input/output unit and said external device includes generating means for generating reference pattern data containing m×n×l colors, m, n and l each representing a number of divided stages of a respective one of the red, green and blue signals, and multiple regression analyzing means for calculating a color correction coefficient on each color on the basis of the data of l ×m×n colors.

21. A color copying machine having at least an image reading unit and a printing unit, comprising:

means for generating reference pattern data containing m×n×l colors, m, n and l each representing a number of divided stages of a respective one of the red, green and blue signals;

means for converting the reference pattern data generated by said generating means and the data obtained by said image reading unit, the printed matter being obtained by printing the reference pattern data using said printing unit, into color values of m×n×l based on perception characteristics;

multiple regression analyzing means for calculating a color correction coefficient on each color on the basis of the color values converted by said converting means; and means for performing a color correction operation with respect to the color correction coefficients calculated by said multiple regression analyzing means.

22. A color copying machine having at least an image reading unit and a printing unit, comprising:

means for generating reference pattern data containing m×n×l colors, m, n and each representing a number of divided stages of a respective one of the red, green and blue signals;

multiple regression analyzing means for calculating a color correction coefficient on each color on the basis of the data of l×m×n colors contained in the reference pattern data generated by said generating means and the data of l×m×n colors obtained by reading a printed matter of said printing unit using said image reading unit, the printed matter being obtained by said printing unit; and means for performing a color correction operation with respect to the color correction coefficients calculated by said multiple regression analyzing means.

\* \* \* \* \*